May 10, 1927.
J. S. WARREN
CANE STRIPPER
Filed May 18, 1926
1,628,087
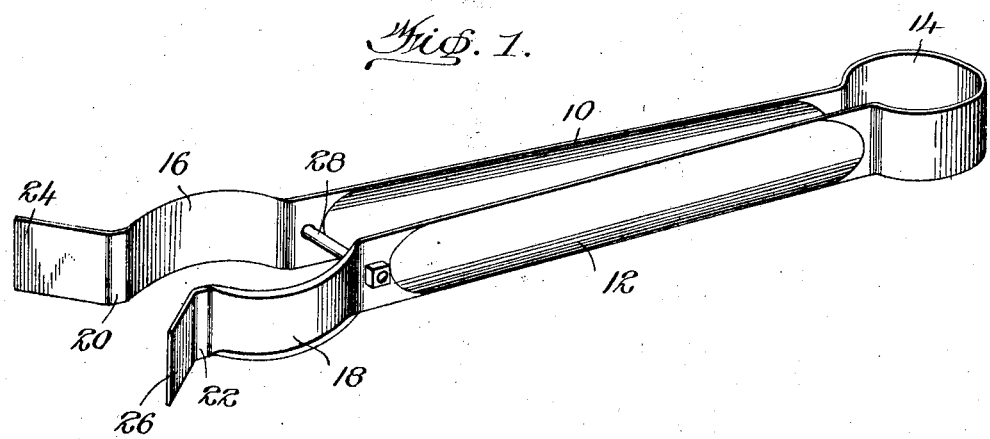
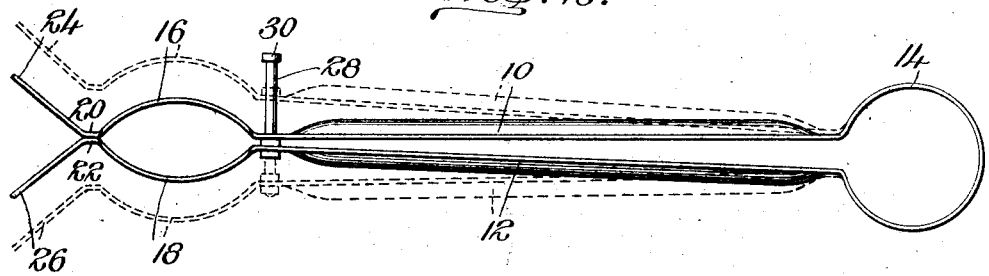
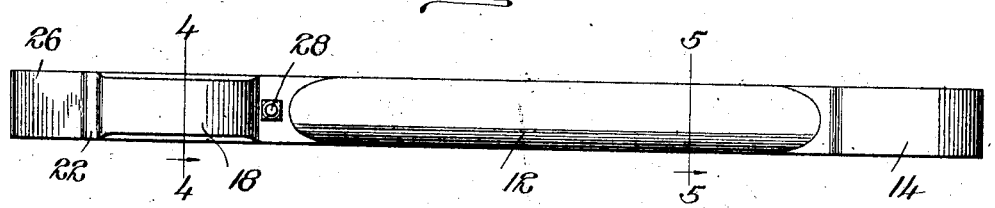
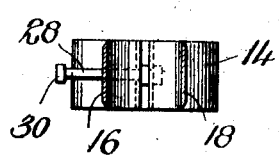
Inventor
John S. Warren,
by Bright & Bailey
Attorneys Patented May 10, 1927.

1,628,087

UNITED STATES PATENT OFFICE.

JOHN S. WARREN, OF SUN, MISSISSIPPI.

CANE STRIPPER.

Application filed May 18, 1926. Serial No. 109,836.

My invention relates to cane strippers, and my purpose, generally speaking, is to provide a device of this kind that is simple in construction, inexpensive to manufacture and thoroughly reliable and efficient in use.

More particularly, it is my purpose to provide a cane stripper including essentially a pair of cooperating knives or cutters adapted for engagement with opposite side portions of a cane stalk, whereby the leaves may rapidly be severed from the stalk simply by moving the stripper downward along the same, and it is my specific purpose to provide yieldable means connecting said knives or cutters so that they may readily be engaged with a stalk and as readily removed therefrom when the stripping operation has been completed; also, to provide means to limit separation of said knives or cutters with respect to one another as well as to limit movement of the same in the direction of a stalk with which they are being engaged, whereby the possibility of wrongly engaging the stripper with a stalk substantially is eliminated, and further, to provide means in the form of a pair of diverging fingers to guide the knives or cutters into engagement with a stalk, together with means to eliminate substantially any interference of said fingers with short leaves or other growths close to a stalk during stripping of the longer leaves from the latter.

With the foregoing and other purposes in view, my invention consists in the novel features of construction, combination and arrangement of parts as will be hereinafter more fully described, illustrated in the accompanying drawings and defined in the appended claim.

In the drawings, wherein like characters of reference denote corresponding parts in the different views:

Fig. 1 is a perspective of a cane stripper embodying the novel and essential features of my invention;

Fig. 2, an elevation of my stripper showing the normal position of the knives or cutters thereof in dotted lines and showing an operative position of said knives or cutters in full lines;

Fig. 3, an elevation at right angles to Fig. 2;

Fig. 4, a transverse section on the line 4—4 of Fig. 3; and

Fig. 5, a transverse section on the line 5—5 of Fig. 3.

By reference to the drawings it will be observed that my improved stripper is formed from a single strip of sheet metal, steel for example, of any desired length, width and thickness, said strip being bent upon itself intermediate its ends to provide a pair of arms 10 and 12 and a resilient ring 14 connecting adjacent ends of said arms whereby the latter are urged normally apart as shown by full and dotted lines in Figures 1 and 2, respectively.

Each arm 10 and 12 includes a straight portion which extends from ring 14 a suitable distance to provide a handle for manipulating the stripper, said arms to this end either being pressed or otherwise curved transversely outwardly as best shown in Fig. 5, or provided with facings of wood or other material in a well known manner to increase their thickness and thus provide suitable hand grips.

The straight handle or hand grip portions of the arms 10 and 12 terminate remote from ring 14 in outwardly curved knife or cutter portions 16 and 18, respectively, each of which is sharpened along both of its edges as clearly and best shown in Figures 1, 3 and 4 of the drawings, said portions 16 and 18, in turn, terminating remote from handle portions 10 and 12 in short straight portions 20, 22 respectively, which latter portions finally terminate in fingers 24, 26, respectively, which are outwardly directed, or, in other words flared with respect to one another to provide guides to facilitate engagement of the knife portions upon a stalk when the stripper is moved longitudinally in the direction of the stalk as is obvious.

A bolt or pin 28 is secured rigidly at one end to the straight portion of one of the arms 10 or 12 adjacent to portion 16 or 18 as the case may be and an opening is formed in the other of said arms through which said bolt or pins is loosely engaged whereby the arms may be moved freely inwardly and outwardly with respect to one another and whereby a stop is formed between the arms 10 and 12 for engagement with a stalk during application of the stripper thereto to facilitate proper positioning of the knife or cutter portions 16, 18 of the stripper upon the stalk, said bolt or pin furthermore serving to maintain the arms 10, 12 against edgewise movement with respect to one another out of a common plane, and being provided at its free end with a head 30 whereby the permissible amount of relative separating movement of said arms also is limited.

The manner of using my improved stripper is apparent and as follows: The straight portions of arms 10, 12 constituting the handle of said stripper are loosely grasped in the hand of the operator and the device is moved longitudinally towards the stalk to be stripped, the fingers 24, 26 contacting with the stalk and guiding the latter into the space between the knife or cutter portions 16, 18, bolt or pin 28 acting as a stop as aforementioned to prevent the stripper being moved onto a stalk beyond said knife or cutter portions. Arms 10, 12 then are pressed together until the knife or cutter portions 16, 18 are brought against opposite side portions of the stalk to be stripped, after which the stripper is moved longitudinally along the stalk with a sweeping stroke to cause the knives or cutters to shear the leaves therefrom.

By sharpening both edges of each of the portions 16, 18 care need not be exercised in selecting which sides of the stripper are disposed uppermost and lowermost, and by providing the straight portions 20, 22 between the curved portions 16, 18 and the fingers 24, 26 the latter are caused to be disposed more or less remote from a stalk with which the stripper is engaged so as not to interfere with short leaves and other growths on the stalk during cutting movement of the stripper along the latter. Obviously, if desired, resilient ring 14 may be arranged to maintain the arms 10, 12 normally at their limit of movement towards one another, or at a position intermediate their limits of relative inward and outward movement, instead of as shown maintaining said arms normally separated at their limit of relative outward movement, as in the hands of some operators it may be found that more rapid stripping may be effected if the ring is arranged to function in one of the alternative manners mentioned.

From the foregoing description considered in connection with the accompanying drawings it is believed that the construction, operation and advantages of my improved stripper will be freely understood. I desire to point out, however, that minor changes and desirable additions may be made in and to the stripper shown within the spirit and scope of my invention as defined in the appended claim.

I claim:

A cane stripper comprising a pair of arms each including a handle portion, a knife or cutter portion and a finger for directing the stripper into operative engagement with a stalk to be stripped, yieldable means connecting said arms together, said means permitting said arms to move towards and away from one another and also to move in a direction at right angles to their direction of movement towards and away from one another, and a pin or bolt secured rigidly to one of said arms and engaged loosely through an opening in the other of said arms, to hold said arms against movement in a direction at right angles to their direction of movement towards and away from one another, said pin being located adjacent to the knife or cutter portions of said arms whereby it serves as a stop to limit engaging movement of the stripper upon a stalk.

In testimony whereof I hereunto affix my signature.

JOHN S. WARREN.